(12) United States Patent
Takayama et al.

(10) Patent No.: US 8,068,784 B2
(45) Date of Patent: Nov. 29, 2011

(54) COMMUNICATION SYSTEM AND COMMUNICATION DEVICE

(75) Inventors: Yoshihisa Takayama, Kanagawa (JP); Tadashi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 1315 days.

(21) Appl. No.: 11/597,821

(22) PCT Filed: Jun. 27, 2005

(86) PCT No.: PCT/JP2005/011735
§ 371 (c)(1), (2), (4) Date: Nov. 24, 2006

(87) PCT Pub. No.: WO2006/001420
PCT Pub. Date: Jan. 5, 2006

(65) Prior Publication Data
US 2008/0020707 A1 Jan. 24, 2008

(30) Foreign Application Priority Data
Jun. 28, 2004 (JP) ................................. 2004-190192

(51) Int. Cl.
*H04B 7/00* (2006.01)
*H04K 1/00* (2006.01)
(52) U.S. Cl. ..................... 455/41.2; 380/270; 380/273
(58) Field of Classification Search .................. None
See application file for complete search history.

(56) References Cited

U.S. PATENT DOCUMENTS

| | | | | |
|---|---|---|---|---|
| 6,081,601 A * | 6/2000 | Raivisto | ........................ | 380/270 |
| 6,483,919 B1 * | 11/2002 | Lund et al. | .................... | 380/247 |
| 7,155,607 B2 * | 12/2006 | Yokota et al. | ................. | 713/168 |
| 7,336,926 B2 * | 2/2008 | Noda et al. | .................... | 455/41.2 |
| 7,596,223 B1 * | 9/2009 | Vogel, III | ....................... | 380/270 |
| 2002/0094778 A1 * | 7/2002 | Cannon et al. | .................. | 455/41 |
| 2002/0186846 A1 | 12/2002 | Nyberg et al. | | |

(Continued)

FOREIGN PATENT DOCUMENTS
EP 1 024 626 A1 8/2000
(Continued)

OTHER PUBLICATIONS

Office Action issued Oct. 19, 2010, in Japan Patent Application No. 2004-190192 (with English-language Translation).

(Continued)

*Primary Examiner* — Duc Nguyen
*Assistant Examiner* — Ayodeji Ayotunde
(74) *Attorney, Agent, or Firm* — Oblon, Spivak, McClelland, Maier & Neustadt, L.L.P.

(57) ABSTRACT

A communication apparatus includes a short-range communication unit and a long-range communication unit that communicates via electromagnetic waves in a range wider than a communication area of the short-range communication unit. The communication apparatus further includes a session key generating unit that generates a random number and uses the random number to generate a session key. In addition, the communication apparatus includes an encrypting unit that encrypts the session key. The communication apparatus uses an encryption key transmitted from an external communication apparatus to encrypt the session key into an encrypted session key, transmits the encrypted session key to the external communication apparatus, and receives from the external communication apparatus a communication switching request signal to request a switching from a short-range communication by the short-range communication unit to a long-range communication, with the session key, the long-range communication unit.

14 Claims, 7 Drawing Sheets

U.S. PATENT DOCUMENTS

| | | |
|---|---|---|
| 2003/0093663 A1 | 5/2003 | Walker |
| 2004/0214524 A1* | 10/2004 | Noda et al. ............ 455/41.2 |
| 2005/0249139 A1* | 11/2005 | Nesbit ................... 370/312 |
| 2006/0258338 A1* | 11/2006 | Markki et al. .......... 455/414.1 |

FOREIGN PATENT DOCUMENTS

| | | |
|---|---|---|
| JP | 4-156118 | 5/1992 |
| JP | 2000 224156 | 8/2000 |
| JP | 2000-224156 | 8/2000 |
| JP | 2002-344438 | 11/2002 |
| JP | 2003-18148 | 1/2003 |
| JP | 2003-32176 | 1/2003 |
| JP | 2003 324446 | 11/2003 |
| JP | 2004-364145 | 12/2004 |
| WO | WO2004/023748 A1 * | 3/2004 |

OTHER PUBLICATIONS

Ryozo Kiyohara, et al., "A Method of Detection of Communication Route for Data Sharing between Mobile Devices", Multimedia, Dispersion, Collaboration and Mobile (DICOMO 2006), Symposium memoirs, Japan, Information Processing Society of Japan, vol. 1, No. 6, Jul. 5, 2006, pp. 1-4 (with two additional pages).

* cited by examiner

COMMUNICATION SYSTEM AND COMMUNICATION DEVICE

TECHNICAL FIELD

The present invention relates to a communication system and a secure communication apparatus, which are capable of transmitting and receiving data by wireless communication.

BACKGROUND ART

Communication systems in which information processing apparatuses, such as computers, are connected to each other with wireless communication means, such as a WLAN (wireless local area network) or Bluetooth®, to transmit and receive information including files and data and to share the information are generally built along with advancement of information technology.

In recent years, long-range-communication-function mounted apparatuses, in which communication devices capable of long range communication using Bluetooth or the like are mounted on mobile phones or personal computers, are used to transmit and receive large volume data including moving picture data and music data (for example, refer to Japanese Unexamined Patent Application Publication No. 2003-324446).

In order to reduce the risk in security in the long-range data communication, introduction of data encryption processes becomes common even in the long range communication. The risk in security includes sniffing of data by third parties with long-range-communication-function mounted apparatuses and alternation of data.

It is necessary to identify communication partners in order to perform the encryption process in the long range communication adopting Bluetooth or the like. However, unexpected long-range-communication-function mounted apparatuses are possibly identified as the communication partners because of the wide communication area of the long range communication.

Even if the communication partners are identified, it is necessary to share a session key used for starting more secure communication between the communication partners. However, there is a possibility that the session key is sniffed and decrypted by the third parties with the long-range-communication-function mounted apparatuses when the session key is transmitted to the communication partner, because of the wide communication area of the long range communication. Accordingly, it is necessary to increase the strength of the session key, for example, by lengthening the keys and, therefore, to provide a higher processing power to the long-range-communication-function mounted apparatuses.

Accordingly, it is an object of the present invention to provide new and improved communication system and communication apparatus, which are capable of easily identifying a communication partner and securely sharing a session key between the communication apparatus the communication partner even if the communication apparatus has a processing power that is not so high.

DISCLOSURE OF INVENTION

In order to resolve the above problems, according to a first aspect of the present invention, a communication system includes a plurality of communication apparatuses. A first communication apparatus includes short-range active communication means for transmitting an inquiry signal to a short-range external communication apparatus by electromagnetic waves and waiting for a response to the inquiry signal; long-range communication means capable of communication by the electromagnetic waves in a range wider than the communication area of the short-range active communication means; switching means for switching to either the short-range active communication means or the long-range communication means; and asymmetric key generating means for generating a pair of an encryption key and a decryption key corresponding to the encryption key, the encryption key and the decryption key in the pair being asymmetric to each other. A second communication apparatus includes short-range passive communication means for receiving the inquiry signal from a short-range external communication apparatus and transmitting a response signal in response to the inquiry signal; long-range communication means capable of communication by the electromagnetic waves in a range wider than the communication area of the short-range passive communication means; switching means for switching to either the short-range passive communication means or the long-range communication means; session key generating means for generating a random number and using the generated random number to generate a session key; and encrypting means for encrypting the session key. The second communication apparatus uses the encryption key transmitted from the first communication apparatus to encrypt the session key into an encrypted session key and transmits the encrypted session key to the first communication apparatus. The first communication apparatus uses the decryption key to decrypt the encrypted session key into the session key and transmits to the second communication apparatus a communication switching request signal to request the switching to the long-range communication means and communication by using the long-range communication means.

The short-range active communication means may transmit identification information allocated to the short-range active communication means to the short-range passive communication means along with the encryption key, and the short-range passive communication means may transmit identification information allocated to the short-range passive communication means to the short-range active communication means along with the encrypted session key to provide the identification information of the communication partner to the long-range communication means provided in the first and second communication apparatuses.

In order to resolve the above problems, according to another aspect of the present invention, a communication apparatus includes short-range active communication means for transmitting an inquiry signal to a short-range external communication apparatus by electromagnetic waves and waiting for a response to the inquiry signal; long-range communication means capable of communication by the electromagnetic waves in a range wider than the communication area of the short-range active communication means; switching means for switching to either the short-range active communication means or the long-range communication means; and asymmetric key generating means for generating a pair of an encryption key and a decryption key corresponding to the encryption key, the encryption key and the decryption key in the pair being asymmetric to each other. The communication apparatus uses the decryption key to decrypt an encrypted session key transmitted from the external communication apparatus and transmits to the external communication apparatus a communication switching request signal to request the switching to the long-range communication means and communication by using the long-range communication means.

The short-range active communication means may transmit identification information allocated to the short-range active communication means to the external communication apparatus along with the encryption key.

The short-range active communication means may transmit identification information allocated to the short-range active communication means to the external communication apparatus along with the encryption key and may receive identification information allocated to the external communication apparatus from the external communication apparatus along with the encrypted session key to provide the identification information of the communication partner to the long-range communication means provided in the communication apparatus and the external communication apparatus.

In order to resolve the above problems, according to another embodiment of the present invention, a second communication apparatus in a communication apparatus includes short-range passive communication means for receiving an inquiry signal from a short-range external communication apparatus and transmitting a response signal in response to the inquiry signal; long-range communication means capable of communication by electromagnetic waves in a range wider than the communication area of the short-range passive communication means; switching means for switching to either the short-range passive communication means or the long-range communication means; session key generating means for generating a random number and using the generated random number to generate a session key; and encrypting means for encrypting the session key. The communication apparatus uses an encryption key transmitted from the external communication apparatus to encrypt the session key into an encrypted session key and transmits the encrypted session key to the first communication apparatus, and the communication apparatus receives from the external communication apparatus a communication switching request signal to request the switching to the long-range communication means and communication by using the long-range communication means.

The short-range passive communication means may receive identification information allocated to the external communication apparatus along with the encryption key.

The short-range passive communication means may receive identification information allocated to the external communication apparatus along with the encryption key and may transmit identification information allocated to the short-range passive communication means to the external communication apparatus along with the encrypted session key to provide the identification information of the communication partner to the long-range communication means provided in the communication apparatus and the external communication apparatus.

As described above, according to the present invention, since the communication partner can be easily identified in the short range communication and the session key can be shared between the communication apparatus and the communication partner even if the communication apparatus has a processing power that is not so high, it is possible to reduce the risk of the session key that is sniffed and decrypted and to achieve the long range data communication.

BEST MODE FOR CARRYING OUT THE INVENTION

Figure 1:
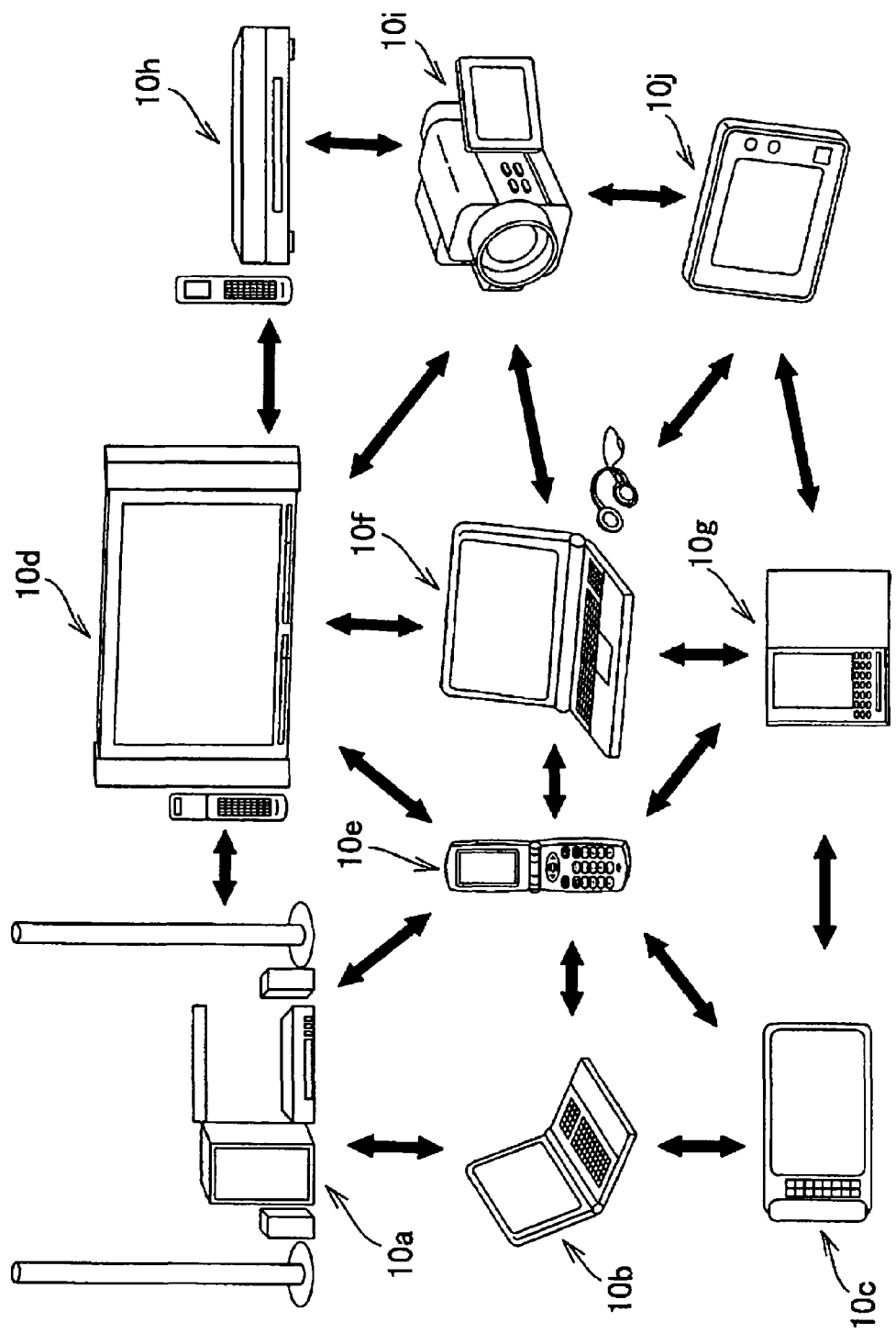
FIG. 1 is a schematic diagram showing the structure of a communication system according to an embodiment.

Preferred embodiments of the present invention will be described in detail with reference to the accompanying drawings. The same reference numerals are used in the following description and the accompanying drawings to identify components having approximately the same functions and structures. A duplicated description of such components is omitted herein.

A communication system according to an embodiment will now be described with reference to FIG. 1. FIG. 1 is a schematic diagram showing the structure of the communication system according to this embodiment.

As shown in FIG. 1, the communication system according to this embodiment includes at least multiple secure-communication-function mounted apparatuses 10 (10a, 10b, ..., 10j).

Also as shown in FIG. 1, a mobile phone, a PDA (personal digital assistant), a pen, a personal computer, and so on each include short range communication means according to Near Field Communication (NFC) or the like, long range communication means using Bluetooth® or the like, and other wireless communication means to securely perform data communication of any kind.

The secure communication means that information is exchanged between the different secure-communication-function mounted apparatuses 10 in a state in which the information is prevented from being sniffed or altered by a third party with the secure-communication-function mounted apparatus 10 and the information is protected without hurting the security or integrity of the information.

In the communication system shown in FIG. 1, one or more of the secure-communication-function mounted apparatuses 10a to 10f must be a reader-writer in order to establish the short range communication using the NFC technology.

The NFC technology in the short range communication uses an electromagnetic wave transmitted from the reader-writer to establish device communication between an IC card and the reader-writer.

In addition, the NFC technology is superior in security to the wireless communication, for example, using the Bluetooth or over a wireless LAN in a physical aspect, because the communication range of the NFC technology, corresponding to the distance between devices, is as short as about 10 cm. For example, it is difficult for a third party to sniff information with the secure-communication-function mounted apparatus 10 when the NFC technology is used. Furthermore, the NFC technology has a characteristic which is different from the characteristics of known communication technologies and in which automatic update is performed when the secure-communication-function mounted apparatuses capable of the near field communication are positioned within a predetermined range.

Although the communication system according to this embodiment has the wireless communication function, for example, according to the NFC or using the Bluetooth, the present invention is not limited to this example. The present invention is applicable to cases using any other wireless communication protocols.

As described above, the NFC is a communication protocol for the short range communication by electromagnetic induction. Carrier waves having a single frequency are used between the secure-communication-function mounted apparatuses 10 in the NFC. For example, the frequency of the carrier waves is equal to 13.56 MHz within ISM (Industrial Scientific Medical) band.

The short range communication means communication in which communication apparatuses within a distance of about 10 cm communicate with each other, and includes communication established by the apparatuses (or the cases of the apparatuses) with being in contact with each other. The long range communication means communication in which communication apparatuses within a distance that is longer than that (about 10 cm) in the short range communication communicate with each other. For example, in Bluetooth, the communication apparatuses within a distance shorter than 10 m can communicate with each other.

Two communication modes, that is, a passive mode and an active mode are available in the NFC. In order to describe the two communication modes, the communication between the secure-communication-function mounted apparatus 10a and the secure-communication-function mounted apparatus 10b, among the secure-communication-function mounted apparatuses 10a to 10f shown in FIG. 1, is exemplified.

In the passive mode, either the secure-communication-function mounted apparatus 10a or the secure-communication-function mounted apparatus 10b (for example, the secure-communication-function mounted apparatus 10a) modulates an electromagnetic wave (the carrier wave corresponding to the electromagnetic wave) that is generated by itself.

After the modulation, the secure-communication-function mounted apparatus 10a transmits the modulated data to the other secure-communication-function mounted apparatus, that is, the secure-communication-function mounted apparatus 10b. The secure-communication-function mounted apparatus 10b performs load modulation to the electromagnetic wave (the carrier wave corresponding to the electromagnetic wave) generated by the secure-communication-function mounted apparatus 10a and returns the modulated data to the secure-communication-function mounted apparatus 10a.

In contrast, in the active mode, both the secure-communication-function mounted apparatus 10a and the secure-communication-function mounted apparatus 10b modulate electromagnetic waves (carrier waves corresponding to the electromagnetic waves) generated by themselves and transmit the modulated data.

In the short range communication by electromagnetic induction, for example, the near field communication, the apparatus that first outputs the electromagnetic wave to start the communication and that has the initiative of the communication is called an initiator. The initiator transmits a command (request) to the communication partner and the communication partner returns a response in response to the command to establish the short range communication. The apparatus that returns the response in response to the command from the initiator and that is the communication partner is called a target.

For example, when the secure-communication-function mounted apparatus 10e in FIG. 1 outputs an electromagnetic wave to start the communication with the secure-communication-function mounted apparatus 10a, the secure-communication-function mounted apparatus 10e is the initiator and the secure-communication-function mounted apparatus 10a is the target.

In the passive mode, for example, when the secure-communication-function mounted apparatus 10j in FIG. 1 is the initiator and the secure-communication-function mounted apparatus 10g in FIG. 1 is the target, the secure-communication-function mounted apparatus 10j, which is the initiator, continuously outputs an electromagnetic wave, modulates the electromagnetic wave that is output by itself, and transmits the data to the secure-communication-function mounted apparatus 10g, which is the target. The secure-communication-function mounted apparatus 10g performs the load modulation to the electromagnetic wave output from the secure-communication-function mounted apparatus 10j, which is the initiator, and transmits the modulated data to the secure-communication-function mounted apparatus 10j.

In contrast, in the data transmission in the active mode, the secure-communication-function mounted apparatus 10j, which is the initiator, starts to output an electromagnetic wave, modulates the electromagnetic wave, and transmits the modulated data to the secure-communication-function mounted apparatus 10g, which is the target. After the data transmission is terminated, the secure-communication-function mounted apparatus 10j stops the outputting of the electromagnetic wave. Similarly, in the data transmission, the secure-communication-function mounted apparatus 10g, which is the target, also starts to output an electromagnetic wave, modulates the electromagnetic wave, and transmits the modulated data to the secure-communication-function mounted apparatus 10j, which is the target. After the data transmission is terminated, the secure-communication-function mounted apparatus 10g stops the outputting of the electromagnetic wave.

The short range communication according to the NFC, described above, is used to perform a process of establishing secure communication according to this embodiment. The process of establishing secure communication is a communication start session in which a predetermined process is performed at the start of secure data communication between apparatuses. As described below in detail, the process of establishing secure communication according to this embodiment is a communication start session capable of using the characteristic in that the near field communication is limited to a narrower range to further improve the security, compared with known processes of establishing secure communication.

Specifically, in the communication system according to this embodiment, when the data communication is performed between the secure-communication-function mounted apparatuses 10, both of the secure-communication-function mounted apparatuses 10 use the short range communication, such as the near field communication, to perform the process of establishing secure communication before starting the data communication. In the process of establishing secure communication, for example, a session key is shared with the communication partner and the short range communication is switched to the long range communication using, for example, the Bluetooth® before the data communication is started.

With the above structure, performing the process of establishing secure communication in the short range communication in advance before the data communication is started can prevent confidential information, such as the session key, from being sniffed to safely perform the long range data communication.

In the case of the Bluetooth communication, which is one kind of the long range communication according to this embodiment, the secure-communication-function mounted apparatus 10 can transmit data to another secure-communication-function mounted apparatus 10 that is around 10 m away from the original secure-communication-function mounted apparatus 10. Accordingly, if the secure-communication-function mounted apparatus 10 attempts to perform the process of establishing secure communication in the long range communication, there is a possibility that data is sniffed by a third party within the communication area.

Figure 2:
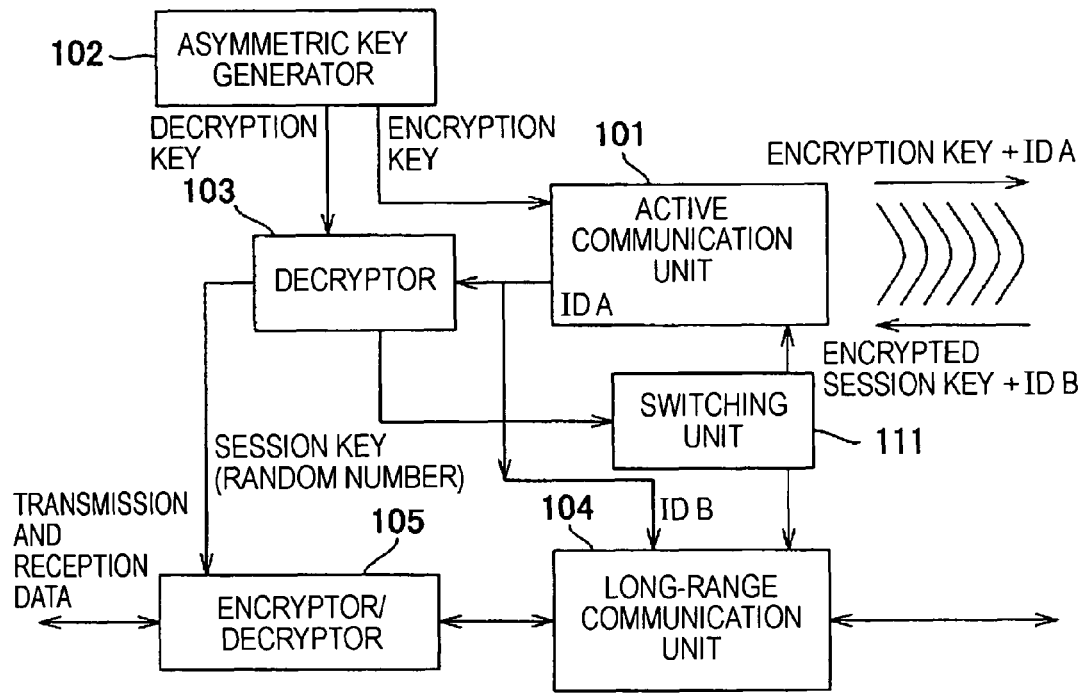
FIG. 2 is a block diagram schematically showing the structure of a secure communication apparatus according to an embodiment.

A secure communication apparatus 20 serving as an initiator, according to an embodiment, will now be described with reference to FIG. 2. FIG. 2 is a block diagram schematically showing the secure communication apparatus according to this embodiment.

As shown in FIG. 2, the secure communication apparatus 20 according to this embodiment includes an active communication unit 101 capable of the near field communication, an asymmetric key generator 102, a decryptor 103, a long-range communication unit 104, an encryptor/decryptor 105, and a switching unit 111.

The secure communication apparatus 20 is provided inside or outside the secure-communication-function mounted apparatus 10. The secure-communication-function mounted apparatus 10 can establish the data communication with an external apparatus by the use of the communication function of the secure communication apparatus 20.

The active communication unit 101 is an initiator capable of the above-described near field communication and generates an electromagnetic wave for a passive communication unit, which is a target, described below. An identifier (ID) used in the short range communication or the long range communication is allocated in advance to and stored in the active communication unit 101. As shown in FIG. 2, an ID "A" (ID A) is allocated to the active communication unit 101. The ID is not limited to the storage in the active communication unit 101 and may be stored in any block as long as the block is provided with storing means. In addition, the ID allocated to the active communication unit 101 is not limited to the ID A and any ID may be allocated to the active communication unit 101.

The asymmetric key generator 102 generates an asymmetric key that is a pair of an encryption key and a decryption key. A plain text (data) encrypted with the encryption key (hereinafter sometimes referred to as a public key) can be decrypted only with the decryption key (hereinafter sometimes referred to as a secret key), which is one-half of the generated pair.

Among the keys generated by the asymmetric key generator 102, which is the initiator, the encryption key is transmitted to a passive communication unit 106, which is a target, and is used as the encryption key when the session key is transmitted. The passive communication unit 106 and the session key will be described below.

The encryption key and the decryption key, generated by the asymmetric key generator 102, are based on a public key cryptosystem, such as a Rivest Shamir Adleman (RSA) cryptosystem, an elliptic curve cryptosystem, or an ElGamal cryptosystem. In order to verify the validity of the generated encryption key, a digital certificate conforming to an international standard, such as X.509, may be transmitted along with the encryption key by, for example, Public Key Infrastructure (PKI).

Although the asymmetric key generator 102 according to this embodiment generates the encryption key and the decryption key, which are asymmetric to each other, the present invention is not limited to this case. For example, the asymmetric key generator 102 may generate an encryption key and a decryption key, which are symmetric to each other (the encryption key and the decryption key are sometimes collectively referred to as a common key).

The decryptor 103 decrypts encrypted data, such as an encrypted session key, received by the active communication unit 101, with the decryption key generated by the asymmetric key generator 102. When the received encrypted data is the encrypted session key, the encrypted session key is decrypted into a session key that is used as a common key for encryption and decryption in the communication with the long-range communication unit 104, described below. The encryption and decryption with the common key is based on a secret key cryptosystem and has a processing speed that is several hundred to several thousand times higher than that of the encryption and decryption with the public key or the secret key. Accordingly, the encryption and decryption with the common key has a lower processing load on the apparatus.

The long-range communication unit 104 has a function of transmitting and receiving data in the long range communication using, for example, the Bluetooth. When the data is transmitted in the long range communication, it is necessary to specify the ID (for example, ID B) of the communication partner, which is allocated in advance, and to transmit the specified ID.

The encryptor/decryptor 105 decrypts the data received by the long-range communication unit 104 with the session key decrypted by the decryptor 103. Alternatively, the encryptor/decryptor 105 encrypts data to be transmitted from the secure-communication-function mounted apparatus 10 to another secure-communication-function mounted apparatus 10. The encrypted data is externally transmitted through the long-range communication unit 104.

The switching unit 111 controls the operations of the active communication unit 101 and the long-range communication unit 104 to switch the communication means in response to an external response. For example, when the decryptor 103 returns a response indicating that the encrypted session key has been decrypted, the switching unit 111 controls the communication functions of the active communication unit 101 and the long-range communication unit 104 to switch from the short range communication to the long range communication (handover). The switching between the short range communication and the long range communication according to this embodiment will be described below.

Figure 3:
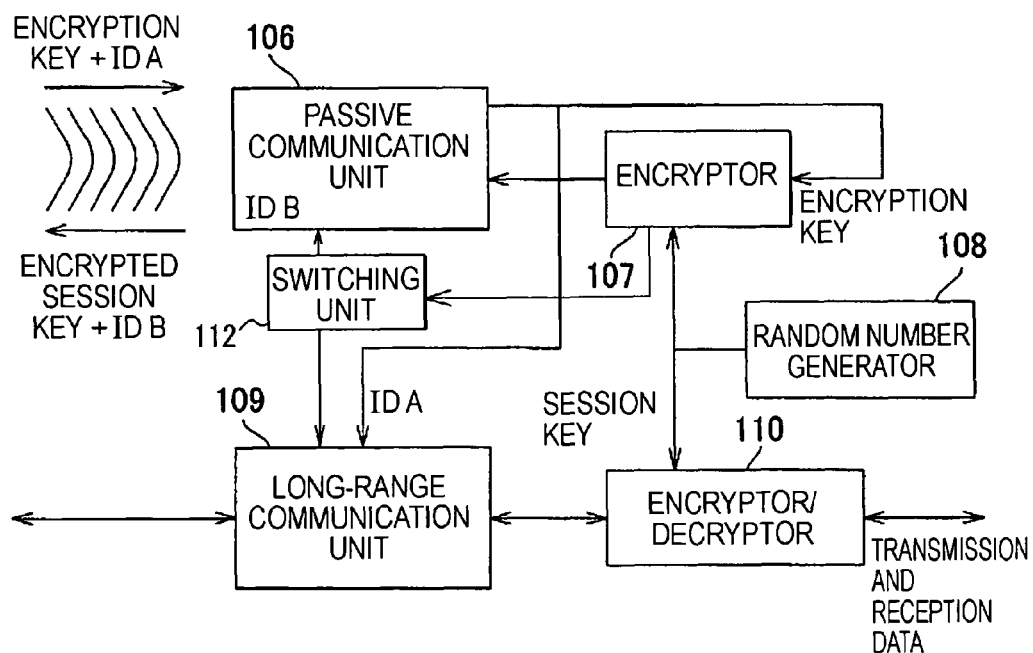
FIG. 3 is a block diagram schematically showing the structure of another secure communication apparatus according to an embodiment.

A secure communication apparatus 22 according to an embodiment will now be described with reference to FIG. 3. FIG. 3 is a block diagram schematically showing the structure of the secure communication apparatus according to this embodiment.

As shown in FIG. 3, the secure communication apparatus 22 according to this embodiment includes the passive communication unit 106 capable of the near field communication, an encryptor 107, a random number generator 108, a long-range communication unit 109, an encryptor/decryptor 110, and a switching unit 112.

The secure communication apparatus 22 is provided inside or outside the secure-communication-function mounted apparatuses 10, like the secure communication apparatus 20 described above.

The passive communication unit 106 shown in FIG. 3 is a target capable of the near field communication, described above, and can respond to the electromagnetic wave transmitted from the initiator. The passive communication unit 106 can receive the electromagnetic wave from the initiator to generate an electromagnetic wave and can return the generated electromagnetic wave.

An identifier (ID) used in the short range communication or the long range communication is allocated in advance to and stored in the passive communication unit 106. As shown in FIG. 3, an ID "B" (ID B) is allocated to the passive communication unit 106. The ID is not limited to the storage in the passive communication unit 106 and may be stored in any block as long as the block is provided with storing means. In addition, the ID allocated to the passive communication unit 106 is not limited to the ID B and any ID may be allocated to the passive communication unit 106.

The encryptor 107 uses the encryption key, which is transmitted from the active communication unit 101 being the initiator and is received by the passive communication unit 106 being the target, to encrypt the generated data, such as the session key, and supplies the generated encrypted data to the passive communication unit 106.

The random number generator 108 generates a random number having a predetermined number of digits at random. The generated random number is used as a bit pattern of the session key (hereinafter sometimes referred to as the random number). Since the bit pattern is the random number generated at random, the bit pattern of the session key is not likely to be guessed by a third party.

Although the random number generator 108 according to this embodiment is, for example, a circuit including hardware that performs sampling for a high-frequency oscillator circuit to generate a true random number, the random number generator 108 is not limited to such a circuit. For example, the random number generator 108 may be a computer program including one or more modules that generate a pseudo random number on the basis of a seed, which is an input bit pattern.

Since the long-range communication unit 109, the encryptor/decryptor 110, and the switching unit 112 according to this embodiment have approximately the same structures as the long-range communication unit 104, the encryptor/decryptor 105, and the switching unit 111, respectively, shown in FIG. 2, a detailed description is omitted herein.

Although the secure communication apparatus 20 and the secure communication apparatus 22 are separated from each other in the above embodiments, the present invention is not limited to this case. For example, the secure communication apparatus 20 and the secure communication apparatus 22 (the initiator and the target) may be integrated into one.

Figure 4:
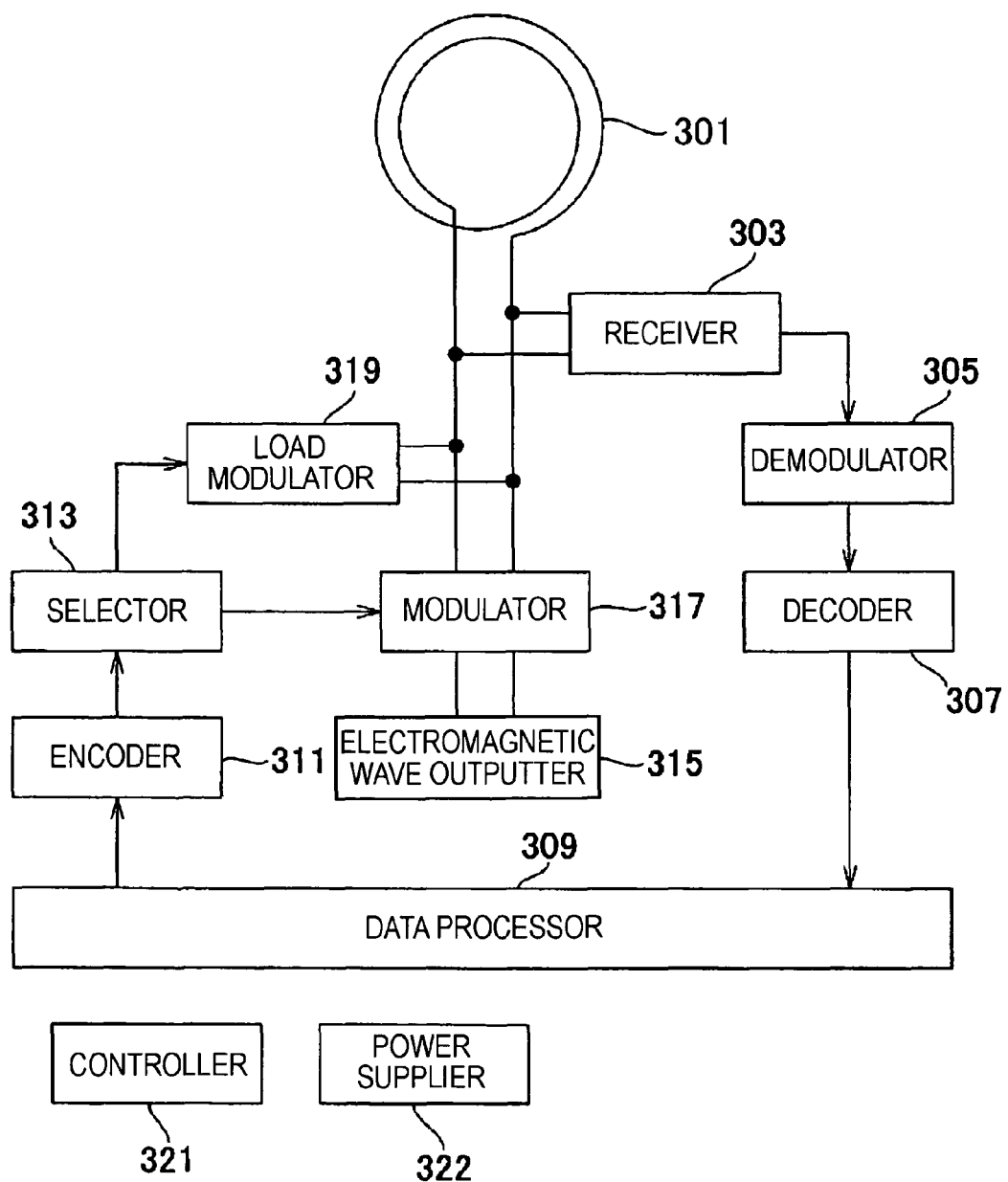
FIG. 4 is a block diagram schematically showing the structure of an active communication unit according to an embodiment.

The active communication unit 101 according to this embodiment will now be described with reference to FIG. 4. FIG. 4 is a block diagram schematically showing the structure of the active communication unit according to this embodiment. Since the passive communication unit 106 shown in FIG. 3 is structured in approximately the same manner as in the active communication unit 101, a detailed description of the passive communication unit 106 is omitted herein.

As shown in FIG. 4, the active communication unit 101 according to this embodiment includes an antenna 301, a receiver 303, a demodulator 305, a decoder 307, a data processor 309, an encoder 311, a selector 313, an electromagnetic wave outputter 315, a modulator 317, a load modulator 319, a controller 321, and a power supplier 323.

The antenna 301 is a closed loop coil and outputs an electromagnetic wave in response to a variation in a current flowing through the coil. A variation in the magnetic flux through the coil functioning as the antenna 301 causes the current to flow through the antenna 301.

The receiver 303 receives the current flowing through the antenna 30, performs at least tuning and detection, and supplies a signal to the demodulator 305. The demodulator 305 demodulates the signal supplied from the receiver 303 and supplies the demodulated signal to the decoder 307. The decoder 307 decodes, for example, a Manchester code, which is the signal supplied from the demodulator 305, and supplies data resulting from the decoding to the data processor 309.

The data processor 309 performs predetermined processing on the basis of the data supplied from the decoder 307. The data processor 309 also supplies data to be transmitted to another apparatus to the encoder 311.

The encoder 311 encodes the data supplied from the data processor 309 into, for example, a Manchester code and supplies the encoded data to the selector 313. The selector 313 selects either the modulator 317 or the load modulator 319 and supplies the signal supplied from the encoder 311 to the selected modulator.

The selector 313 selects the modulator 317 or the load modulator 319 under the control of the controller 321. The controller 321 controls the selector 313 so as to select the modulator 317 if the communication mode is the active mode or if the communication mode is the passive mode and the active communication unit 101 is the initiator. The controller 321 controls the selector 313 so as to select the load modulator 319 if the communication mode is the passive mode and the active communication unit 101 is the target.

Accordingly, the signal output from the encoder 311 is supplied to the load modulator 319 through the selector 313 in the case where the communication mode is the passive mode and the active communication unit 101 is the target. In contrast, the signal output from the encoder 311 is supplied to the modulator 317 through the selector 313 in the other cases.

The electromagnetic wave outputter 315 applies, to the antenna 301, a current causing the antenna 301 to radiate a carrier wave (the electromagnetic wave corresponding to the carrier wave) having a predetermined frequency. The modulator 317 modulates the carrier wave, which is the current supplied from the electromagnetic wave outputter 315 and flowing through the antenna 301, in accordance with the signal supplied from the selector 313. The antenna 301 radiates the electromagnetic wave resulting from the modulation of the carrier wave in accordance with the data supplied from the data processor 309 to the encoder 311.

The load modulator 319 varies the impedance occurring when the coil is externally viewed as the antenna 301 in accordance with the signal supplied from the selector 313. If another apparatus outputs an electromagnetic wave, which is a carrier wave, to form an RF field (magnetic field) around the antenna 301, the impedance occurring when the coil is viewed as the antenna 301 is varied to vary the RF field around the antenna 301. As a result, the carrier wave, which is the electromagnetic wave output from the other apparatus, is modulated in accordance with the signal supplied from the selector 313 and the data supplied from the data processor 309 to the encoder 311 is transmitted to the other apparatus outputting the electromagnetic wave.

The modulator 317 and the load modulator 319 adopt, for example, amplitude shift keying (ASK) as the modulation method. However, the modulation method adopted in the modulator 317 and the load modulator 319 is not limited to the ASK. Phase shift keying (PSK), quadrature amplitude modulation (QAM), or others may be adopted as the modulation method in the modulator 317 and the load modulator 319. The degree of the modulation is not limited to a predetermined value, such as a value from 8% to 30%, 50%, or 100%, and may be set to a preferred value.

The controller 321 controls each block in the active communication unit 101. The power supplier 323 supplies a required power to each block in the active communication unit 101. Referring to FIG. 4, lines indicating the control of each block in the active communication unit 101 by the controller 321 and lines indicating the supply of the power to each block in the secure-communication-function mounted apparatuses 1 by the power supplier 323 are omitted for simplicity.

Although the decoder 307 and the encoder 311 process the Manchester code in this embodiment, the present invention is not limited to the above case. The decoder 307 and the encoder 311 may select one kind of code from multiple kinds of codes including not only the Manchester code but also modified mirror and non-return-to-zero (NRZ) to process the code of the selected kind.

If the active communication unit 101 operates only as the target in the passive mode, the selector 313, the electromagnetic wave outputter 315, and the modulator 317 may be removed from the active communication unit 101. In this case, the power supplier 322 yields power, for example, from an external electromagnetic wave received by the antenna 301.

The secure-communication-function mounted apparatus 10 according to this embodiment is structured so as to be capable of the communications according to one or more communication protocols, in addition to the near field communication described above. Accordingly, the near field communication is one of the communications according to multiple communication protocols. The communication protocols include, in addition to the NFC, ISO/IEC (International Organization for Standardization/International Electrotechnical Commission) 14443 defining the communication with an IC card, ISO/IEC 15693 defining the communication with an RF tag (radio frequency tag), Bluetooth, and WLAN or other communication protocols.

Figure 5:
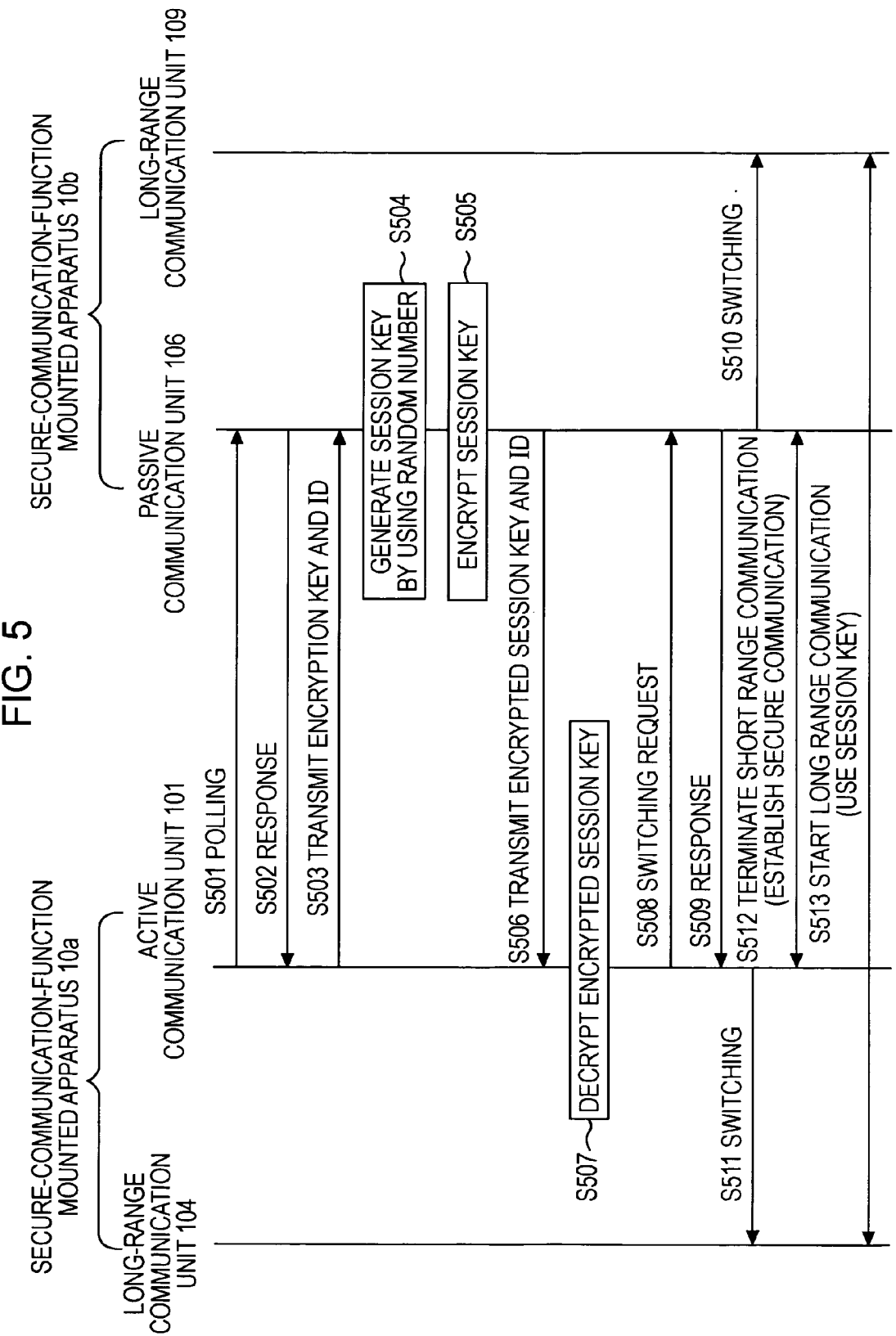
FIG. 5 is a sequence diagram schematically showing a series of communication processing in the communication system, according to an embodiment.

A series of communication processing in a communication system 100 according to an embodiment will now be described with reference to FIG. 5. FIG. 5 is a sequence diagram schematically showing the series of communication processing in the communication system according to this embodiment.

As shown in FIG. 5, when the secure-communication-function mounted apparatus 10a communicates with the secure-communication-function mounted apparatus 10b, it is necessary to establish the secure communication in the short range communication. Hence, the secure-communication-function mounted apparatus 10a is moved, in advance, to a range in which the secure-communication-function mounted apparatus 10a can establish the short range communication with the secure-communication-function mounted apparatus 10b.

Figure 6:
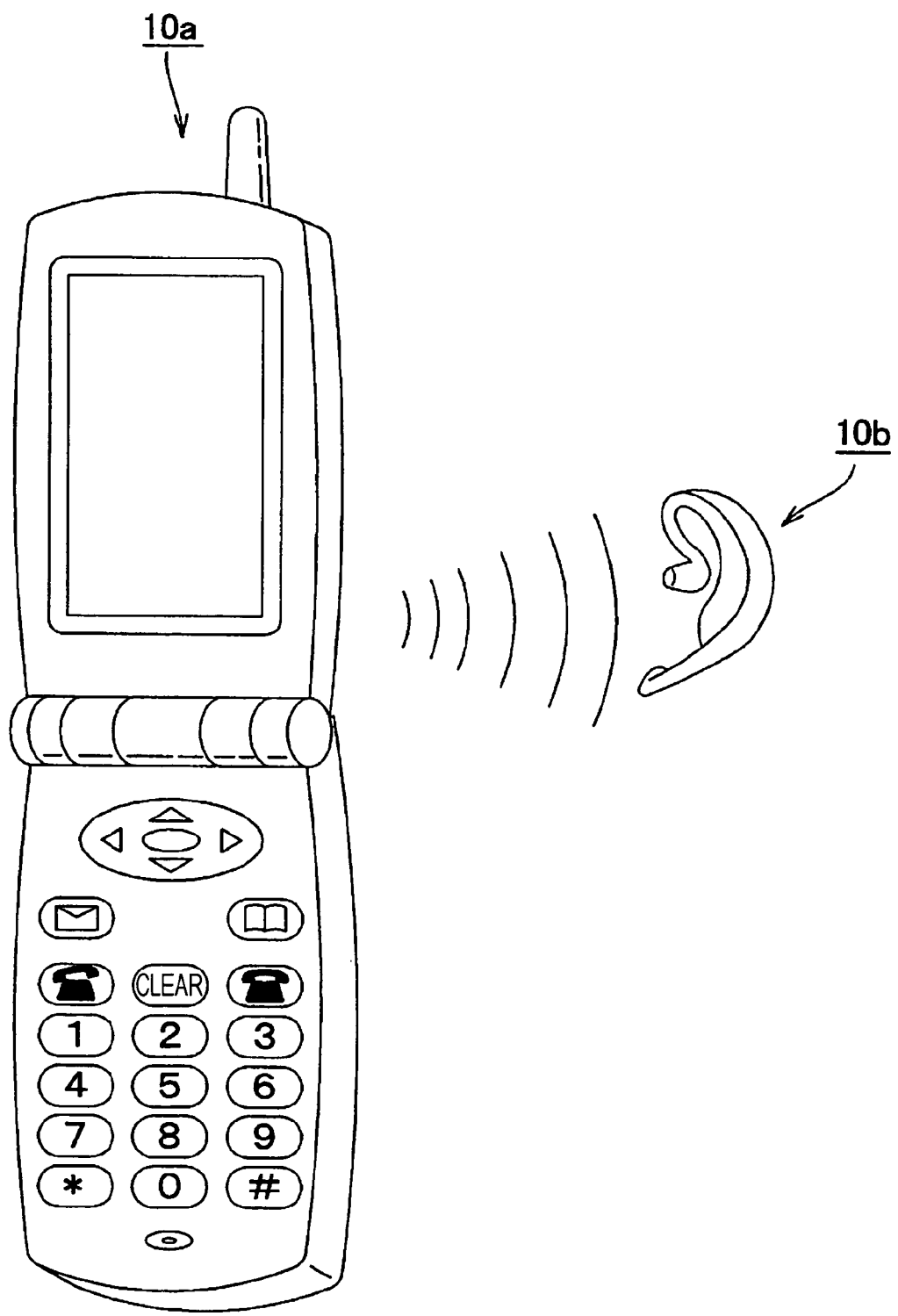
FIG. 6 is a schematic diagram illustrating short range communication between the secure-communication-function mounted apparatuses, according to an embodiment.

A case where the secure-communication-function mounted apparatus 10a and the secure-communication-function mounted apparatus 10b, according to this embodiment, are located within a range in which the short range communication can be established between them will now be described with reference to FIG. 6. FIG. 6 is a schematic diagram illustrating the short range communication between the secure-communication-function mounted apparatus 10a and the secure-communication-function mounted apparatus 10b according to this embodiment.

As shown in FIG. 6, when the secure-communication-function mounted apparatus 10a is moved to a range, for example, of about 10 cm from the secure-communication-function mounted apparatus 10b, both the secure-communication-function mounted apparatuses 10a and 10b are within the range in which the short range communication can be established. Secure communication is established between the secure-communication-function mounted apparatuses 10a and 10b to achieve the long range data communication. Although the secure-communication-function mounted apparatus 10a in FIG. 6 is a mobile phone and the secure-communication-function mounted apparatus 10b in FIG. 6 is a headset for the mobile phone, the secure-communication-function mounted apparatuses 10a and the 10b are not limited to this example. The headset, which is provided with a speaker and a microphone, transmits and receives audio data to and from the mobile phone to realize direct communication with the mobile phone even if a user does not directly have the mobile phone at one ear.

Figure 7:
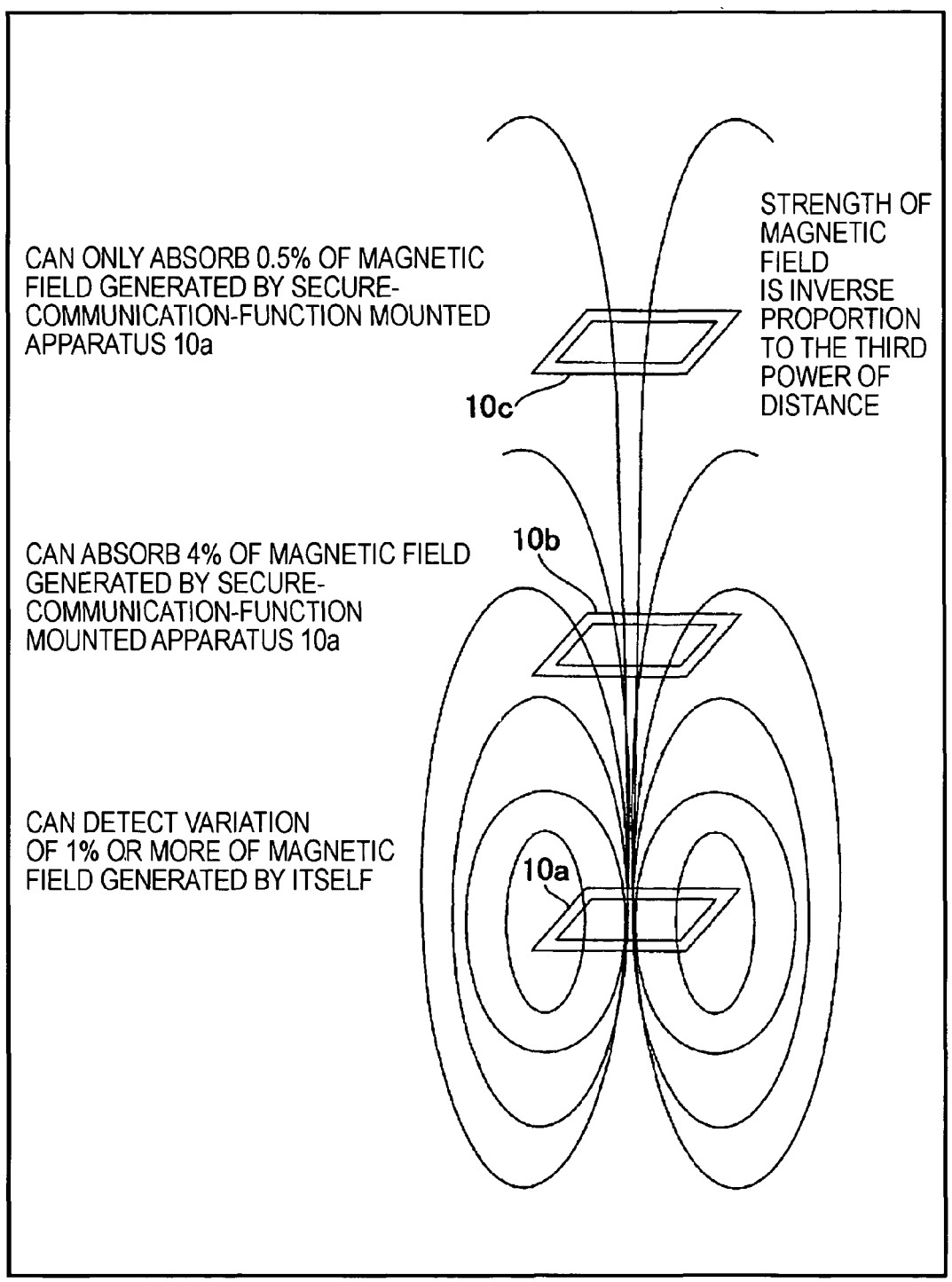
FIG. 7 is a schematic diagram illustrating a process of establishing secure communication in the short range communication between the secure-communication-function mounted apparatuses, according to an embodiment.
Figure 8:
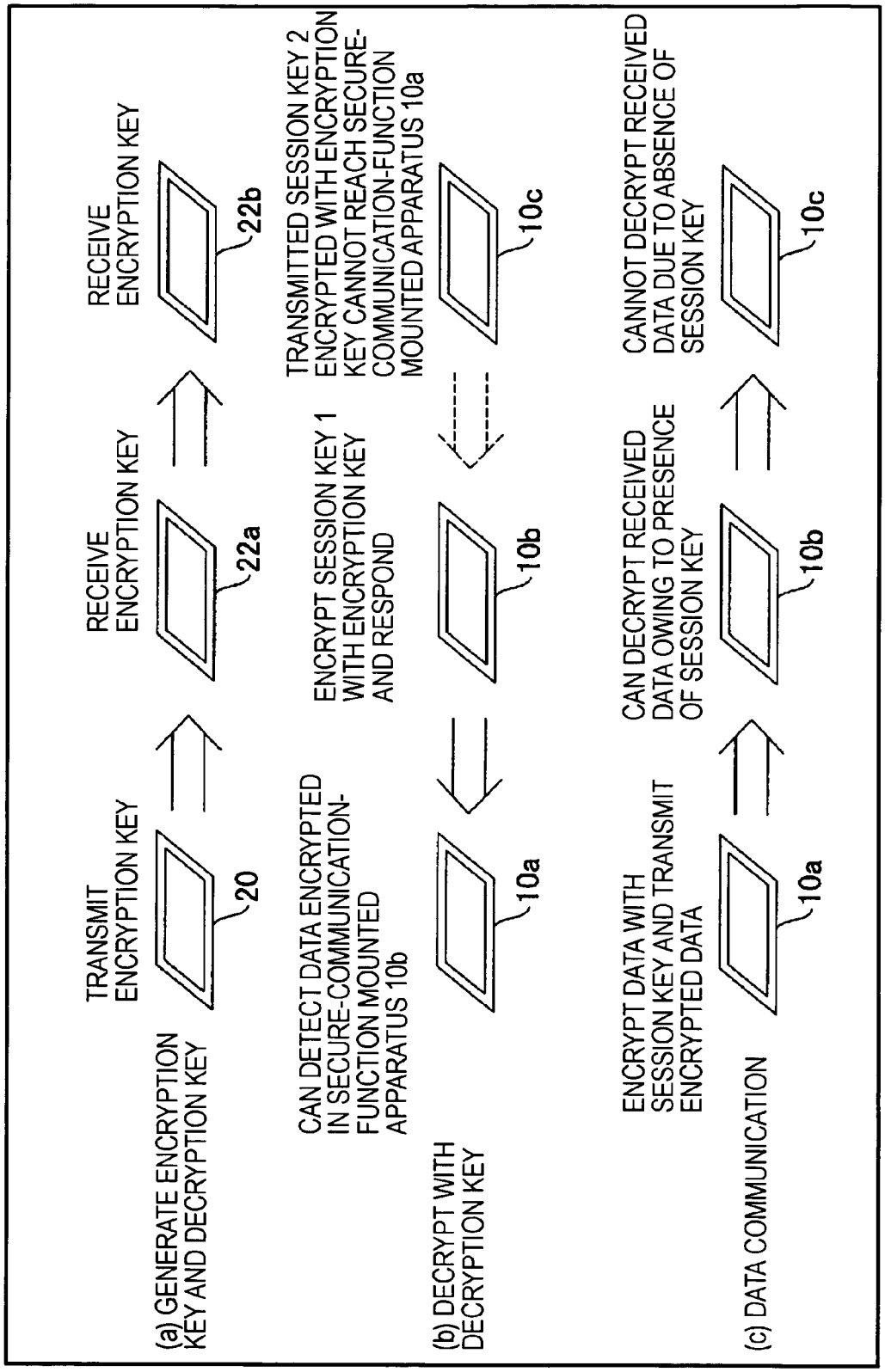
FIG. 8 is another schematic diagram illustrating the process of establishing secure communication in the short range communication between the secure-communication-function mounted apparatuses, according to an embodiment.

The process of establishing secure communication in the short range communication between the secure-communication-function mounted apparatuses 10 according to this embodiment will now be described with reference to FIGS. 7 and 8. FIGS. 7 and 8 are schematic diagrams illustrating the process of establishing secure communication in the short range communication between the secure-communication-function mounted apparatuses 10 according to this embodiment.

As shown in FIG. 7, the secure-communication-function mounted apparatus 10a, which is the initiator, and the secure-communication-function mounted apparatuses 10b and 10a, which are the targets, are provided. The secure-communication-function mounted apparatus 10a emits an electromagnetic wave outside.

The secure-communication-function mounted apparatus 10a can detect a variation of 1% or more in the magnetic field that is produced by itself. Specifically, if a variation of 1% or more in the magnetic field is caused by an external secure-communication-function mounted apparatus 10, the secure-communication-function mounted apparatus 10a can determine that the variation corresponds to a response from the external secure-communication-function mounted apparatus 10.

As shown in FIG. 7, the secure-communication-function mounted apparatus 10b can absorb 4% of the magnetic field (or the electromagnetic wave) produced by the secure-communication-function mounted apparatus 10a. The secure-communication-function mounted apparatus 10b can reflect the absorbed magnetic field so as to vary 1% or more of the generated magnetic field to respond to the secure-communication-function mounted apparatus 10a.

In other words, the secure-communication-function mounted apparatus 10b shown in FIG. 7 is located within a range of, for example, about 10 cm away from the secure-communication-function mounted apparatus 10a. The short range communication between the secure-communication-function mounted apparatus 10a and the secure-communication-function mounted apparatus 10b can be established within the range.

The secure-communication-function mounted apparatus 10c can only absorb 0.5% of the magnetic field generated by the secure-communication-function mounted apparatus 10a. Even if the secure-communication-function mounted apparatus 10c reflects all the absorbed magnetic field, the secure-communication-function mounted apparatus 10a cannot detect a variation in the magnetic field. Consequently, the secure-communication-function mounted apparatus 10c cannot respond to the secure-communication-function mounted apparatus 10a.

In other words, the secure-communication-function mounted apparatus 10c is located within a range in which the short range communication with the secure-communication-function mounted apparatus 10a cannot be established.

Since the short range communication according to this embodiment can only be established within a limited range, the risk of the data sniffing is reduced, compared with communication means having a wider communication area, for example, having a radius of 10 m.

Next, as shown in FIG. 8(*a*), in order to establish the secure communication according to this embodiment, the secure-communication-function mounted apparatus 10a generates an encryption key and a decryption key corresponding to the encryption key.

The encryption key is transmitted outside from the secure-communication-function mounted apparatus 10a over the magnetic field. Accordingly, as shown in FIG. 8(*a*), both the secure-communication-function mounted apparatus 10b and the secure-communication-function mounted apparatus 10c can receive the data regardless of whether they are located within the range in which the short range communication can be established.

However, as shown in FIG. 8(*b*), the secure-communication-function mounted apparatus 10c cannot respond to the secure-communication-function mounted apparatus 10a even if the secure-communication-function mounted apparatus 10c receives the encryption key, as described above with reference to FIG. 7. Hence, only the secure-communication-function mounted apparatus 10b can encrypt the session key generated by itself and returns the generated session key to the secure-communication-function mounted apparatus 10a.

As shown in FIG. 8(*c*), even if the secure-communication-function mounted apparatus 10a decrypts the encrypted session key that is received, encrypts data with the session key, and transmits the encrypted data to the secure-communication-function mounted apparatus 10c, the secure-communication-function mounted apparatus 10c cannot decrypt the encrypted data, even if the secure-communication-function mounted apparatus 10c can receive the encrypted data, because there is no session key for the decryption of the encrypted data.

Accordingly, since there is no risk of the encrypted data that is sniffed and decrypted if the secure-communication-function mounted apparatuses 10 are located within in the range in which the short range communication cannot be established, it is possible to securely establish the communication. In addition, the risk of another secure-communication-function mounted apparatus 10 that is located within the range in which the short range communication can be established is very low. This is because the area in which the short range communication can be established is limited in space and is under the control of the user.

The session key according to this embodiment is a one-time key used in the long range data communication. Accordingly, a new session key is generated, for example, for every predetermined time or for every communication session, like a one-time password.

It is enough for the session key, which is first generated with the random number, to be kept secret until the subsequent session key is newly generated. Hence, it is sufficient for the encryption key generated by the asymmetric key generator 102 to have a length that cannot be decrypted in a short time, for example, in one second before the session key is generated and the session key is shared between the secure-communication-function mounted apparatuses 10. In other words, it is necessary to terminate the process of establishing secure communication in a short period of time in order not to provide to a third party an adequate time when the first session key, which is the confidential information, can be decrypted. Since, even if the first session key is sniffed, a secret key having a higher security strength is generated at the subsequent timing and the first session key is disposed, the first session key has no risk of being abused.

Referring back to FIG. 5, first, the active communication unit 101 in the secure-communication-function mounted apparatus 10a performs polling (query processing) in Step S501. The passive communication unit 106 in the secure-communication-function mounted apparatus 10b receives the polling and transmits a response to the polling to the active communication unit 101 in Step S502.

It is assumed that the secure-communication-function mounted apparatus 10a and the secure-communication-function mounted apparatus 10a, shown in FIG. 5, are located within the range in which the short range communication can be established, described above.

The active communication unit 101 receives the response transmitted from the passive communication unit 106 in response to the polling, generates an encryption key and a decryption key, and transmits the encryption key and an ID (for example, an NFC ID) allocated to the active communication unit 101 (S503). The NFC ID corresponds to, for example, "ID A" or "ID B", described above with reference to FIGS. 2 and 3.

After the passive communication unit 106 receives the encryption key and the ID, the random number generator 108 generates a random number at random (S504). The generated random number is used as the session key, as described above.

The encryptor 107 encrypts the generated session key with the encryption key that has been already received (S505). The encrypted session key is transmitted to the active communication unit 101 along with an ID (for example, an NFC ID) allocated to the passive communication unit 106 (S506).

After the active communication unit 101 receives the encrypted session key and the ID, the decryptor 103 decrypts the encrypted session key with the generated decryption key (S507) to yield the session key.

The active communication unit 101 can identify the passive communication unit 106 (the secure-communication-function mounted apparatus 10b), which is the communication partner, on the basis of the ID received from the passive communication unit 106. The passive communication unit 106 can identify the active communication unit 101 (the secure-communication-function mounted apparatus 10a), which is the communication partner, on the basis of the ID received along with the encryption key.

The decrypted session key is supplied to the encryptor/decryptor 105 and the ID of the passive communication unit 106, received by the active communication unit 101, is supplied to the long-range communication unit 104. The ID of the active communication unit 101, received by the passive communication unit 106, is supplied to the long-range communication unit 109 and the session key generated by the random number generator 108 is supplied to the encryptor/decryptor 110. As a result, both the long-range communication unit 104 and the long-range communication unit 109 can identify the communication partner.

After the decryptor 103 decrypts the encrypted session key into the session key (Step S507), the switching unit 111 transmits a switching request to switch from the short range communication, such as the near field communication, to the long range communication using, for example, the Bluetooth, (for example, a request signal for communication switching or a media handover request) to the passive communication unit 106 through the active communication unit 101 (S508).

The Bluetooth communication has a higher transmission speed, transmits large volume data more rapidly and efficiently, and has a wider communication range, compared with the near field communication. Accordingly, it is useful to switch from the short range communication to the long range communication, for example, when a user makes a call with the headset without holding the mobile phone with his hand.

When the switching request is transmitted, communication information necessary for the long range communication is exchanged between the secure-communication-function mounted apparatuses 10, in addition to the identification information, such as the NFC ID, already acquired in the short range communication. The communication information necessary for the long range communication is exemplified by a Bluetooth device address identifying the communication partner in the long range communication.

After receiving the switching request, the passive communication unit 106 transmits a response (for example, a media handover response) to the switching request transmitted from the active communication unit 101 to the active communication unit 101 (S509). The active communication unit 101 receives the response.

The secure-communication-function mounted apparatus 10*a* switches from the short range communication by the active communication unit 101 to the long range communication using, for example, the Bluetooth, by the long-range communication unit 104 (handover) (S511). The secure-communication-function mounted apparatus 10*b* switches from the short range communication by the passive communication unit 106 to the long range communication by the long-range communication unit 109 (handover) (S510).

Sharing of the session key between the secure-communication-function mounted apparatuses 10*a* and 10*b* causes the secure communication to be established and the short range communication between the active communication unit 101 and the passive communication unit 106 is terminated (S512).

Then, secure data communication is performed with the session key shared in the short range communication between the switched long-range communication unit 104 and long-range communication unit 109 (S513). The first session key shared in the short range communication is newly generated, for example, each time the session is terminated. With this structure, it is possible to further improve the security, compared with the process of establishing secure communication in the long range communication. Although the common key on the basis of a common key cryptosystem is used as the session key according to this embodiment, the present invention is not limited to such a session key.

When the short range communication is switched to the long range communication, the long-range communication unit 104 and the long-range communication unit 109 can identify the communication partner to perform the data communication even if the communication partner is not specified by the user.

Since the long-range communication unit 104 and the long-range communication unit 109 can identify the communication partner on the basis of the identification information (for example, the NFC ID) of the communication partner, already acquired in the short range communication, the long-range communication unit 104 and the long-range communication unit 109 do not establish the data communication with communication partners other than the ones identified with the acquired identification information. Accordingly, it is possible to prevent improper data communication with false communication partners.

As described above, when the data communication is established between the secure-communication-function mounted apparatuses 10 in the communication system according to this embodiment, only one secure-communication-function mounted apparatus 10 first entering the communication area in which the short range communication can be established can be identified to securely exchange the session key without complicated settings for the secure communication. In addition, the secure communication can be established in the long range communication having a wider communication area and a higher communication speed, compared with the short range communication, by switching from the short range communication to the long range communication and using the session key shared in the short range communication.

Since the communication partner (the secure-communication-function mounted apparatus 10) of the long range communication can be identified by exchanging the session key used in the short range communication, it is possible to eliminate the risk of establishing the data communication with an unspecified secure-communication-function mounted apparatus 10, thus easily identifying the communication partner to establish the data communication.

In the process of establishing secure communication in the short range communication, it is sufficient for the encryption key used for keeping the session key exchanged between the secure-communication-function mounted apparatuses 10 secret to have a key length so as to provide a strength against identification of the session key by a third party after the encryption key is transmitted before the session key encrypted with the encryption key is decrypted, the session key is exchanged, and the long range communication is started. Hence, it is possible to efficiently perform the process of establishing secure communication even if the processing power, for example, the computational capacity of each apparatus is not so high.

It is sufficient to generate the pair of the encryption key and the decryption key according to this embodiment, if necessary. Since a digital certificate or the like of the pair is not necessarily required, a complicated procedure for registration of the digital certificate can be omitted.

The series of processing, described above, may be performed by dedicated hardware or may be performed by software. If the series of processing is performed by software, the programs in the software are installed in a general-purpose computer or a microcomputer. The programs may be stored in advance in a hard disk drive (HDD) included in the computer or in a storage device, such as a ROM.

The programs may be temporarily or permanently stored (recorded) in a removable recording medium, such as a flexible disk, a CD-ROM (compact disc read only memory), an MO (magneto-optical) disk, a DVD (digital versatile disk), a magnetic disk, or a semiconductor memory, in addition to the above-mentioned HDD or the ROM. Such a removable recording medium may be provided as package software.

The programs may be transferred by wireless communication from a download site in the computer over an artificial satellite for digital satellite broadcasting or may be transferred by wire communication in the computer over a network, such as a LAN (local area network) or the Internet, in addition to being installed from the removable recording medium in the computer. The computer receives the programs transferred in the above manner and installs the programs in the storage device.

In this description, the processing steps describing the programs which the computer uses to perform a variety of processing is not necessarily performed in time series in the order described in the sequence diagram, such as FIG. 5, and may be performed individually or in parallel (including, for example, a parallel process and an object process).

Although the wireless communication is covered in this embodiment, the present invention is not limited to the wireless communication. For example, the present invention is applicable to wire communication or communication in which the wireless communication is mixed with the wire communication.

While the present invention has been described with reference to what are presently considered to be the preferred embodiments and the accompanying drawings, the invention is not limited to the disclosed embodiments. On the contrary, it will be further understood by those skilled in the art that the invention is intended to cover various modifications and equivalent arrangements included within the spirit and scope of the appended claims.

Although the blocks including the asymmetric key generator 102, the decryptor 103, the encryptor/decryptor 105, and the switching unit 111, in the secure communication apparatus 20, are described as hardware in the above embodiments, the present invention is not limited to this example. For example, at least one block, among the above blocks, may be a program including one or more modules or components.

Although the blocks including the encryptor 107, the random number generator 108, the encryptor/decryptor 110, and the switching unit 111, in the secure communication apparatus 22, are described as hardware in the above embodiments, the present invention is not limited to this example. For example, at least one block, among the above blocks, may be a program including one or more modules or components.

Although the case in which two secure-communication-function mounted apparatuses establish the communication is exemplified in the above embodiments, the present invention is not limited to this example. For example, the present invention is applicable to a case in which three secure-communication-function mounted apparatuses establish the communication. In this case, one of the three secure-communication-function mounted apparatuses may serve as an intermediator that relays data transferred between the remaining two secure-communication-function mounted apparatuses.

Although the secure communication apparatus 20 is separated from the secure communication apparatus 22 in the above embodiments, the present invention is not limited to this example. For example, the secure communication apparatus 20 and the secure communication apparatus 22 may be integrated into the secure-communication-function mounted apparatus 10 as a single apparatus.

Industrial Applicability

The present invention is applicable to a communication system and a secure communication apparatus, which are capable of transmitting and receiving data by wireless communication.

The invention claimed is:

1. A communication system, comprising:
   a first communication apparatus including
      first short-range communication means for transmitting an inquiry signal to a short-range external communication apparatus via electromagnetic waves and waiting for a response to the inquiry signal;
      first long-range communication means for communicating via electromagnetic waves in a range wider than a communication area of the first short-range communication means;
      first switching means for switching to the first short-range communication means or the first long-range communication means; and
      asymmetric key generating means for generating an encryption key and a decryption key corresponding to the encryption key, the encryption key and the decryption key being asymmetric to each other, and
   a second communication apparatus including
      second short-range communication means for receiving the inquiry signal from a short-range external communication apparatus and transmitting a response signal in response to the inquiry signal;
      second long-range communication means for communicating via electromagnetic waves in a range wider than a communication area of the second short-range communication means;
      second switching means for switching to the second short-range communication means or the second long-range communication means;
      session key generating means for generating a random number and using the random number to generate a session key; and
      encrypting means for encrypting the session key, wherein
   the second communication apparatus uses the encryption key transmitted from the first communication apparatus to encrypt the session key into an encrypted session key and transmits the encrypted session key to the first communication apparatus, and
   the first communication apparatus uses the decryption key to decrypt the encrypted session key into the session key and transmits to the second communication apparatus a communication switching request signal to request a switching from a short-range communication by the first and second short-range communication means to a long-range communication, with the session key, by the first and second long-range communication means of the first and second communication apparatuses.

2. The communication system according to claim 1, wherein the first short-range communication means transmits first identification information allocated to the first short-range communication means to the second short-range communication means along with the encryption key, and the second short-range communication means transmits second identification information allocated to the second short-range communication means to the first short-range communication means along with the encrypted session key to provide identification information of communication partners to the first and second long-range communication means of the first and second communication apparatuses.

3. A communication apparatus, comprising:
   short-range communication means for transmitting an inquiry signal to a short-range external communication apparatus via electromagnetic waves and waiting for a response to the inquiry signal;
   long-range communication means for communicating via electromagnetic waves in a range wider than a communication area of the short-range communication means;
   switching means for switching to the short-range communication means or the long-range communication means; and
   asymmetric key generating means for generating an encryption key and a decryption key corresponding to the encryption key, the encryption key and the decryption key being asymmetric to each other, wherein
the communication apparatus uses the decryption key to decrypt an encrypted session key transmitted from an external communication apparatus and transmits to the external communication apparatus a communication switching request signal to request a switching from a short-range communication by the short-range communication means to a long-range communication, with the session key, by the long-range communication means.

4. The communication apparatus according to claim 3, wherein the short-range communication means transmits first identification information allocated to the short-range communication means to the external communication apparatus along with the encryption key, and receives second identification information allocated to the external communication apparatus from the external communication apparatus along with the encrypted session key to provide identification information of communication partners to the external communication apparatus and the long-range communication means of the communication apparatus.

5. A communication apparatus, comprising:
short-range communication means for receiving an inquiry signal from a short-range external communication apparatus and transmitting a response signal in response to the inquiry signal;
long-range communication means for communicating via electromagnetic waves in a range wider than a communication area of the short-range communication means;
switching means for switching to the short-range communication means or the long-range communication means;
session key generating means for generating a random number and using the random number to generate a session key; and
encrypting means for encrypting the session key, wherein
the communication apparatus uses an encryption key transmitted from an external communication apparatus to encrypt the session key into an encrypted session key, transmits the encrypted session key to the external communication apparatus, and receives from the external communication apparatus a communication switching request signal to request a switching from a short-range communication by the short-range communication means to a long-range communication, with the session key, by the long-range communication means.

6. The communication apparatus according to claim 5, wherein the short-range communication means receives first identification information allocated to the external communication apparatus along with the encryption key, and transmits second identification information allocated to the short-range communication means to the external communication apparatus along with the encrypted session key to provide identification information of communication partners to the external communication apparatus and the long-range communication means of the communication apparatus.

7. The communication system according to claim 1, wherein the response signal represents a reflection by the second communication apparatus of a predetermined percentage of the electromagnetic waves produced by the first short-range communication means to the first communication apparatus.

8. The communication system according to claim 7, wherein the first communication apparatus determines the second communication apparatus is within a range for the short-range communication based on a detection of a predetermined percentage variation in the electromagnetic waves generated by the first short-range communication means.

9. The communication system according to claim 1, wherein the first communication apparatus transmits the communication switching request signal in response to a receipt of the session key from the second communication apparatus.

10. The communication system according to claim 1, wherein the second switching means switches to the long-range communication by the second long-range communication means in response to a receipt of the communication switching request signal from the first communication apparatus.

11. The communication system according to claim 1, wherein the second communication apparatus transmits a request response signal to the first communication apparatus in response to a receipt of the communication switching request signal from the first communication apparatus.

12. The communication system according to claim 11, wherein the first switching means switches to the long-range communication by the first long-range communication means in response to a receipt of the request response signal from the second communication apparatus.

13. The communication apparatus according to claim 2, wherein the first identification information must be received by the first communication apparatus and the second identification information must be received by the second communication apparatus before switching to the first and second long-range communication means.

14. A communication apparatus, comprising:
a short-range communication unit configured to receive an inquiry signal from a short-range external communication apparatus and to transmit a response signal in response to the inquiry signal;
a long-range communication unit configured to communicate via electromagnetic waves in a range wider than a communication area of the short-range communication unit;
a switching unit configured to switch to the short-range communication unit or the long-range communication unit;
a session key generating unit configured to generate a random number and to use the random number to generate a session key; and
an encrypting unit configured to encrypt the session key, wherein
the communication apparatus uses an encryption key transmitted from an external communication apparatus to encrypt the session key into an encrypted session key, transmits the encrypted session key to the external communication apparatus, and receives from the external communication apparatus a communication switching request signal to request a switching from a short-range communication by the short-range communication unit to a long-range communication, with the session key, the long-range communication unit.

* * * * *